(12) United States Patent
Wild et al.

(10) Patent No.: US 6,419,607 B1
(45) Date of Patent: Jul. 16, 2002

(54) ACTUATING DEVICE FOR A DIFFERENTIAL LOCK, PREFERABLY A FRICTIONAL LOCK

(75) Inventors: Andreas Wild, Unterensingen; Roland Meyer, Roth, both of (DE)

(73) Assignee: Hydraulik-Ring GmbH, Limbach-Oberfrohna (DE)

( * ) Notice: Subject to any disclaimer, the term of this patent is extended or adjusted under 35 U.S.C. 154(b) by 0 days.

(21) Appl. No.: 09/594,914

(22) Filed: Jun. 15, 2000

(30) Foreign Application Priority Data

Jun. 15, 1999 (DE) .......................... 199 27 079

(51) Int. Cl.[7] ............................................. F16H 48/03
(52) U.S. Cl. ......................................................... 475/88
(58) Field of Search ............................................ 475/88

(56) References Cited

U.S. PATENT DOCUMENTS

| | | | | |
|---|---|---|---|---|
| 5,536,215 A | * | 7/1996 | Shaffer et al. ................. 475/88 |
| 5,595,214 A | * | 1/1997 | Shaffer et al. ................ 137/517 |
| 5,611,746 A | * | 3/1997 | Shaffer ........................... 475/88 |
| 5,735,764 A | * | 4/1998 | Shaffer et al. .................. 475/88 |
| 5,827,145 A | * | 10/1998 | Okcuoglu ....................... 475/88 |
| 5,888,163 A | * | 3/1999 | Shaffer et al. .................. 475/88 |

* cited by examiner

*Primary Examiner*—Dirk Wright
(74) *Attorney, Agent, or Firm*—Gudrun E. Huckett

(57) ABSTRACT

An actuating device for a differential lock has a piston housing having a pressure chamber. An actuator piston is arranged in the pressure chamber of the piston housing. A hydraulic medium tank is provided. A pump conveys a hydraulic medium from the tank to one end of the actuator piston, wherein the actuator piston can move in the pressure chamber and acts on the lock when loaded by the hydraulic medium. One or more conduits connect the hydraulic medium tank and the pressure chamber to one another. The conduit has a temperature-dependent throttle element for adjusting a flow cross-section for the hydraulic medium based on the temperature of the hydraulic medium.

15 Claims, 14 Drawing Sheets

US 6,419,607 B1

ACTUATING DEVICE FOR A DIFFERENTIAL LOCK, PREFERABLY A FRICTIONAL LOCK

BACKGROUND OF THE INVENTION

1. Field of the Invention

The invention relates to an actuating device for a differential lock, preferably a frictional lock, comprising an actuator piston arranged in a pressure chamber on the pressure side of a pump and acting on the differential lock when loaded by the hydraulic medium conveyed by the pump.

2. Description of the Related Art

A differential is known in which a rotor pump, driven by a differential speed (i.e., revolutions per minute or rpm) between the wheel axle and the differential housing, conveys oil into a piston housing in which a piston is axially slidably supported. When pressure is built up by the pump, the piston acts onto a lamella packet which effects by friction the transmission of the drive moment onto the vehicle wheels. A valve with a constant aperture cross-section mounted within the piston provides a differential rpm-dependent torque transmission. The valve makes it possible that the oil flows in a directed manner into the lamella space so that the pressure build-up behind the piston is made dependent on the conveyed oil volume. The constant aperture cross-section ensures a proper function of the lamella lock only within a narrow temperature range because the viscosity of the oil changes greatly with the temperature.

SUMMARY OF THE INVENTION

It is an object of the present invention to configure an actuating device of the aforementioned kind such that the lock operates properly within a wide temperature range.

In accordance with the present invention, this is achieved in that at least one conduit opens into the pressure chamber, has at least one temperature-dependent throttle element and is connected with a tank for the hydraulic medium (pressure medium).

In accordance with the present invention, the temperature-dependent throttle element ensures that the aperture cross-section will change as a function of the temperature of the hydraulic medium. When the temperature of the hydraulic medium increases, its viscosity is decreased and the pressure-medium becomes thinner. In this case, the aperture cross-section is reduced by the temperature-dependent throttle element. At low temperatures and thus a greater viscosity of the hydraulic medium, the aperture cross-section is enlarged by the temperature-dependent throttle element so that even at low temperatures a sufficient volume flow of the hydraulic medium is ensured. The throttle element forms a temperature-compensated valve in order to compensate the temperature dependency of the hydraulic medium viscosity.

DESCRIPTION OF THE PREFERRED EMBODIMENTS

Figure 1:
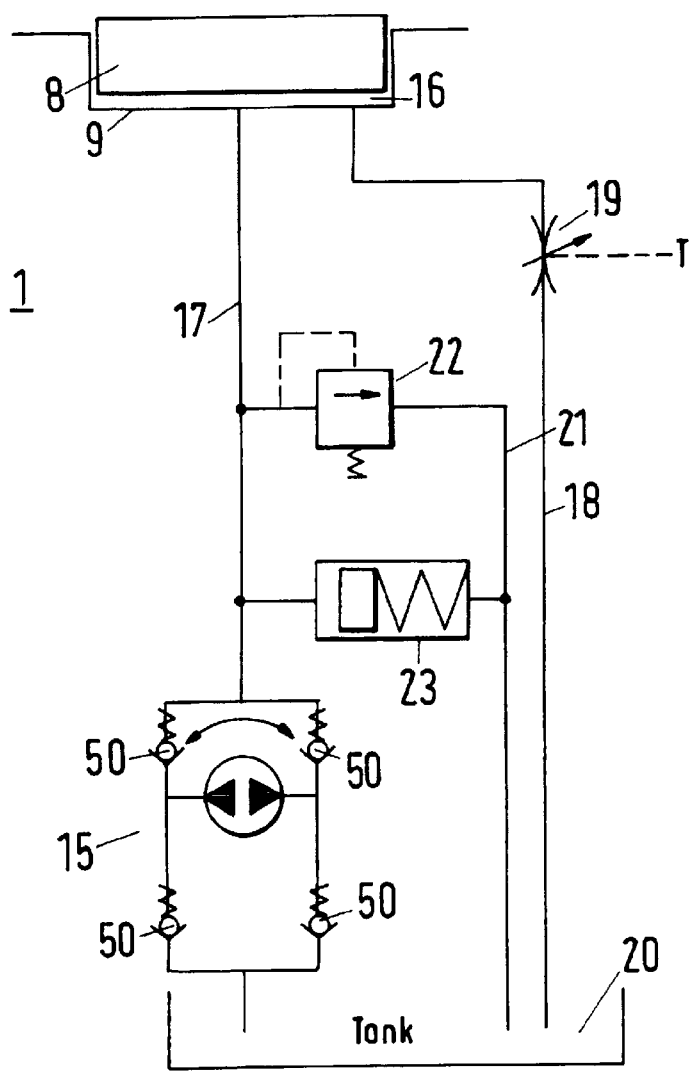
FIG. 1 is a hydraulic schematic of an actuating device according to the invention.

FIG. 1 shows a hydraulic schematic of an actuating device 1 for a lamella lock 2 (FIG. 3) of a differential 3 (FIG. 12) of a vehicle. The lamella lock 2 is formed by a lamella packet having meshing coupling lamellas 4 which are arranged in a lamella housing 5. Every other coupling lamella 4 is seated fixedly on a wheel axle 6 while the interposed coupling lamellas 4 are connected to the lamella housing 5. As is known in the art, frictional coatings are provided on the coupling lamellas 4. The lamella packet is positioned between a gear wheel 7 and an actuator piston 8 which can be loaded by a hydraulic medium for compressing the lamella packet. The actuator piston 8 is arranged in a piston housing 9 that is positioned between the lamella housing 5 and a spacer ring 10. The spacer ring 10 forms a pump housing that is closed by a pump cover 11. The pump cover 11, the spacer ring 10, the piston housing 9, and the lamella housing 5 are connected to one another by means of bolts 12 penetrating them. The spacer ring 10 surrounds an outer ring 13 and an inner ring 14 of a rotor pump 15. The inner ring 14 is seated fixedly on the wheel axle 6 which projects through the pump cover 11 to the exterior. The spacer ring 10, the piston housing 9, and the lamella housing 5 surround the wheel axle 6.

The coupling lamellas 4 are compressed by pressure loading the actuator piston 8 and the differential is locked in this way as will be disclosed in the following.

The actuator piston 8, as is shown in FIG. 1, is loaded on one side with hydraulic medium. A pressure conduit 17 opens into the pressure chamber 16 of the piston housing 9 in which the actuator piston 8 is received. The pressure conduit 17 is connected to the rotor pump 15. Moreover, a tank conduit 18 opens into the pressure chamber 16 via which the hydraulic medium can be returned into the tank 20. A temperature-dependent throttle element 19 is arranged in the tank conduit 18.

A pressure limiting valve 22 is positioned in a branch line 21 of the pressure conduit 17. This valve 22 opens for the purpose of torque limitation or for protecting the transmission against overload or against damage that could occur upon surpassing a predetermined pressure in the pressure conduit 17, and the open valve 22 allows the hydraulic medium to return via the pressure limiting valve 22 and the branch line 21 to the tank 20. A pulsation damping device 23 is mounted between the pressure conduit 17 and the branch line 21. It is positioned upstream of the pressure limiting valve 22 in the flow direction from the tank 20 to the actuator piston 8. The pulsation damping device 23 ensures that pressure pulsations occurring upon operation of the rotor pump 17 can be compensated such that the function of the actuating device is not impaired.

The pressure conduit 17 and the rotor pump 15 are secured by return valves 50 in the direction toward the tank 20.

Figure 2:
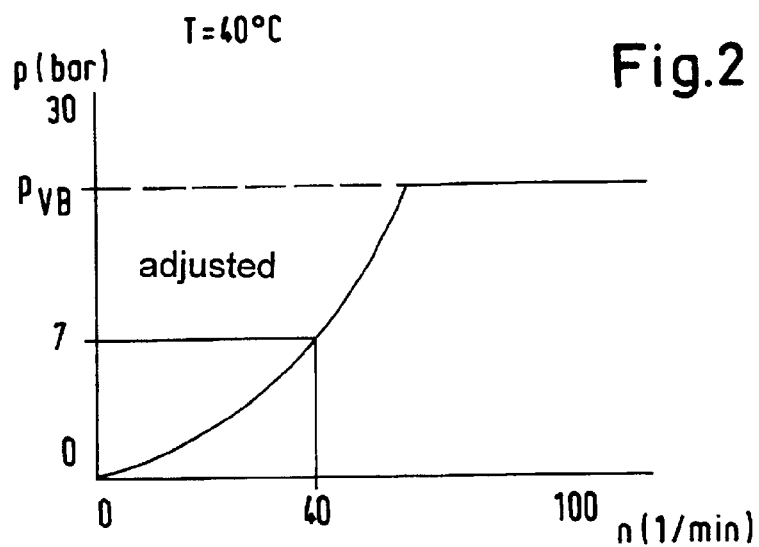
FIG. 2 is a pressure-rpm-diagram of the actuating device according to the invention.

FIG. 2 shows the characteristic line of the actuating device 1 according to FIG. 1 at a temperature of 40° C. Illustrated is the characteristic line of the throttle element 19. With increasing rpm of the rotor pump 15 the hydraulic pressure increases until the limit pressure $p_{VB}$ is reached at a predetermined rpm. With increasing rpm (speed) of the rotor pump 15, the pressure stays at this limit pressure $p_{VB}$.

Figure 3:
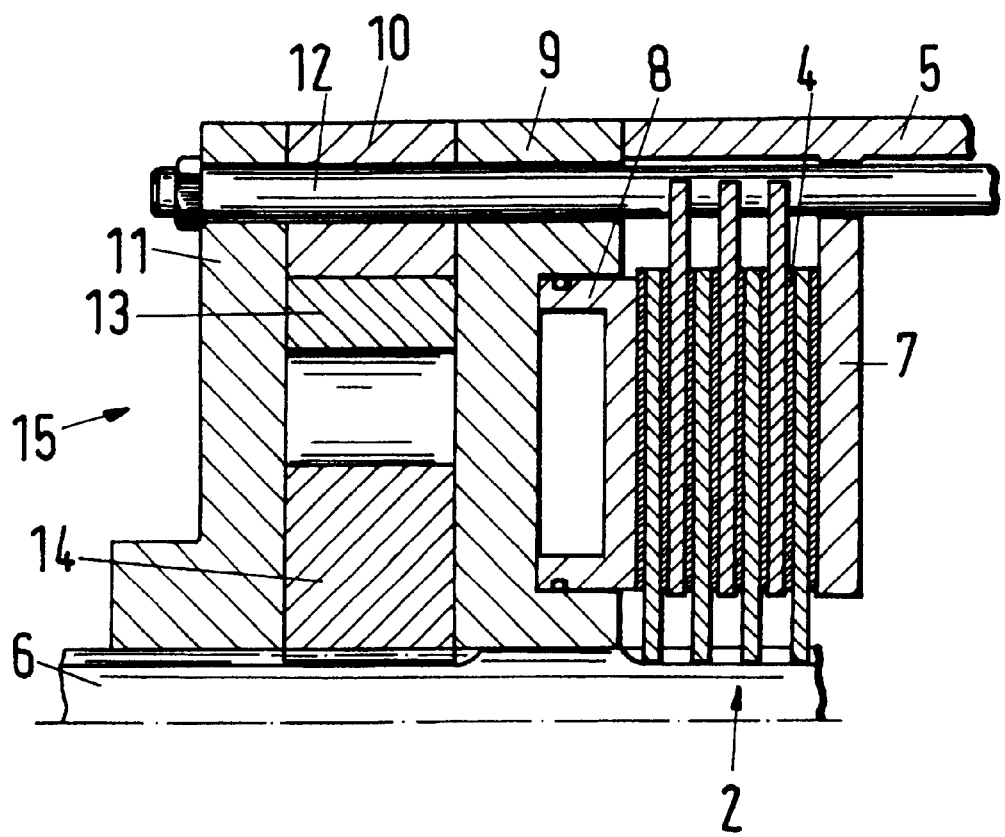
FIG. 3 is a schematic axial section of one half of a differential lock of a differential.
Figure 5:
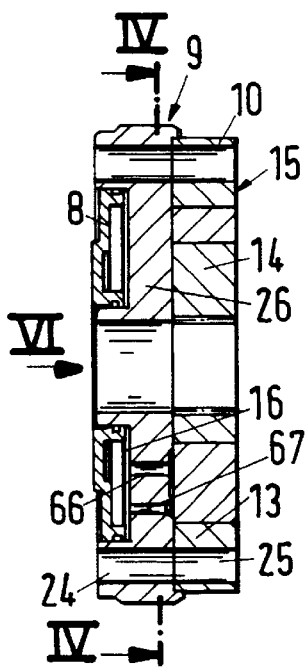
FIG. 5 is an axial section of a part of the actuating device of FIG. 4.

The throttle element 19, the pressure limiting valve 22, and the pulsation dampening device 23 are advantageously arranged in the piston housing 9 (FIG. 3). For the purpose of simplifying the drawings, these elements are not shown in FIG. 3.

FIGS. 4 through 7 show a first embodiment of the actuating device 1. The piston housing 9 has a circular contour. A pressure chamber 16 is provided at one end face and is formed as an annular chamber which receives the piston 8 in the form of an annular piston. The piston 8 is positioned coaxially to the piston housing 9 and is embodied as a hollow piston (see FIG. 5). The rotor pump 15 is connected to the piston housing 9 at the side facing away from the actuator piston 8. The piston housing 9 and the pump housing 10 have bores 24, 25, respectively, for receiving bolts 12 (see FIG. 3) that are advantageously uniformly distributed about the circumference.

The piston housing 9 has a bottom 26 in which two bores 27, 28 are angularly arranged relative to one another. The bore 27 receives the pulsation dampening device 23 and the bore 28 the throttle element 19. Both bores 27, 28 are positioned perpendicularly to the axis 29 of the piston housing 9. One end of the bore 27 is closed off by a closure member 30 which can be threaded from the outer circumference of the piston housing 9 into the end of the bore 27. The opposite end 31 of the bore 27 tapers and is open to the exterior. The other bore 28 is closed off at both ends by a respective closure member 32, 33 that is threaded from the outer circumference of the piston housing 9 into the bore 28.

Moreover, a further bore 34 for receiving the pressure limiting valve 22 is provided in the bottom 26 of the piston housing 9. This bore 34 is also positioned in a plane perpendicular to the axis 29 of the piston housing 9.

A transverse bore 35 opens into the bore 27 in close proximity to the closure member 30 and connects the bore 27 with the pressure chamber 16.

Also, a transverse bore 36 opens into the bore 28. In an end view (see FIG. 6), the transverse bore 36 is shaped as a slotted hole and connects the bore 28 with the pressure chamber 16. This transverse bore 36 is positioned closely adjacent to the closure member 32.

Figure 4:
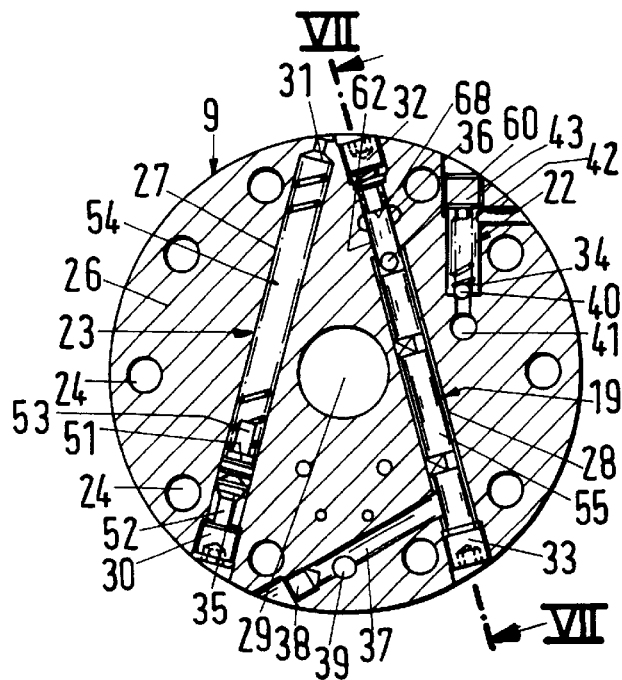
FIG. 4 is a section along the line IV—IV of FIG. 5 of a part of a first embodiment of the actuating device according to the invention.

In close proximity to the oppositely positioned closure member 33, a bore 37 opens into the bore 28 and is positioned in a plane perpendicularly to the axis 29 of the piston housing 9. It extends to the circumference of the piston housing 9 (FIG. 4). This bore 37 is closed off by a closure member 38. A transverse bore 39 (see FIG. 4) opens into the bore 37 via which the hydraulic medium can flow in a manner to be described in the following into the tank 20, into a housing etc.

Figure 6:
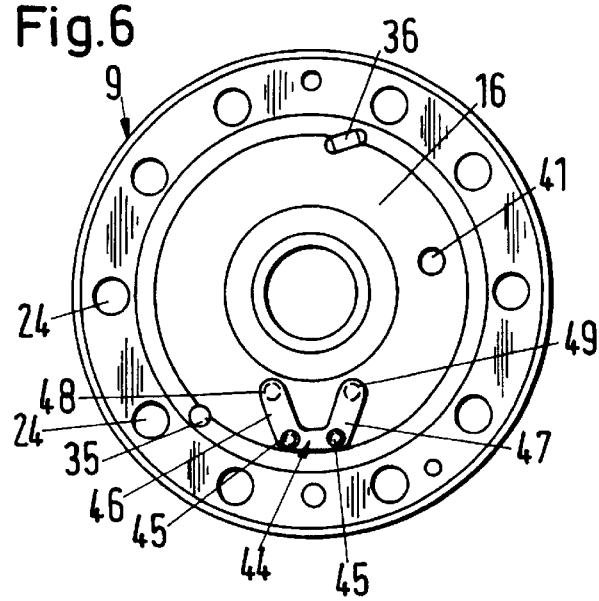
FIG. 6 is a view in the direction of arrow VI in FIG. 5.
Figure 8:
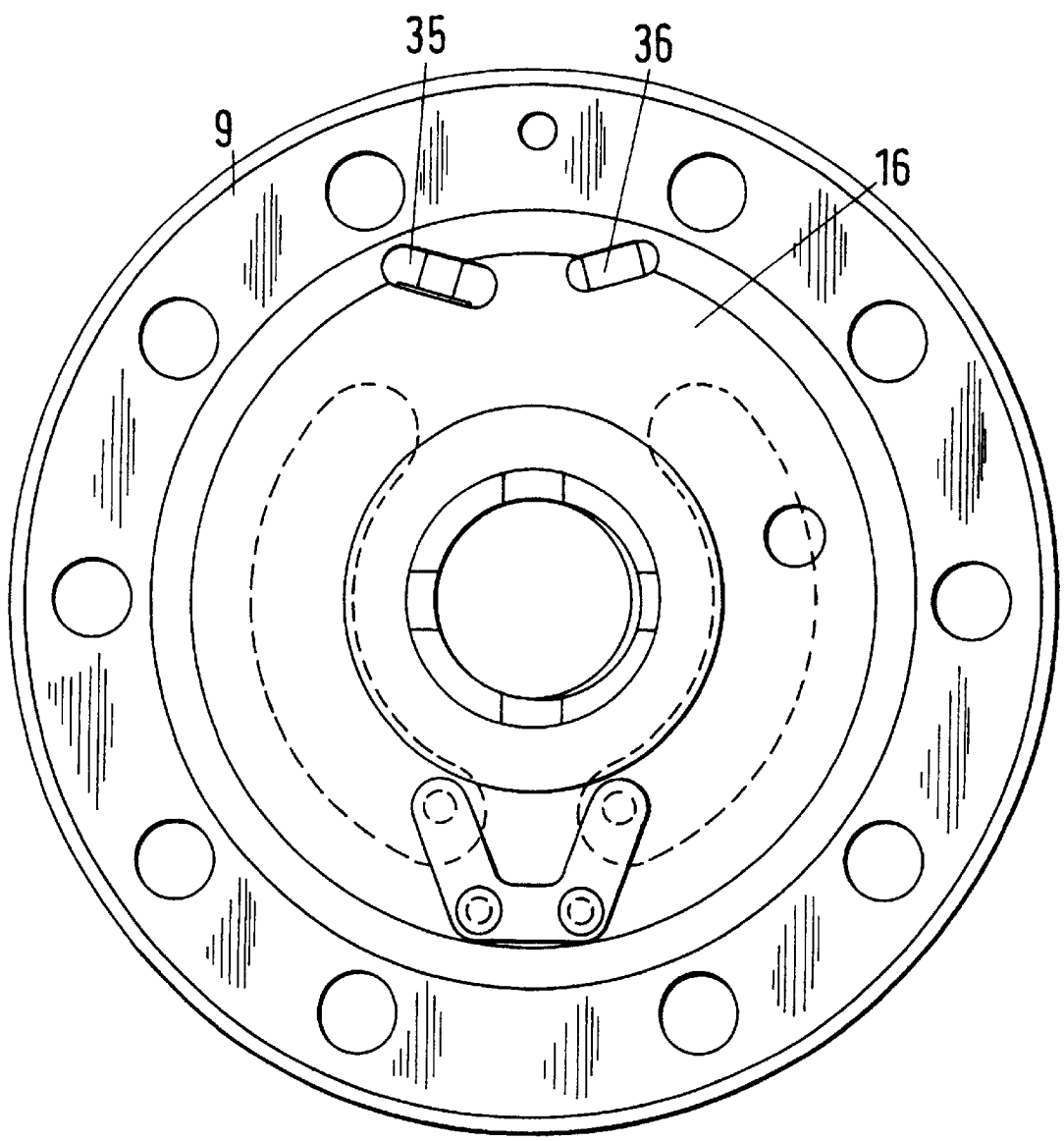
FIG. 8 is an end view of a piston housing of an actuating device according to the invention.
Figure 9:
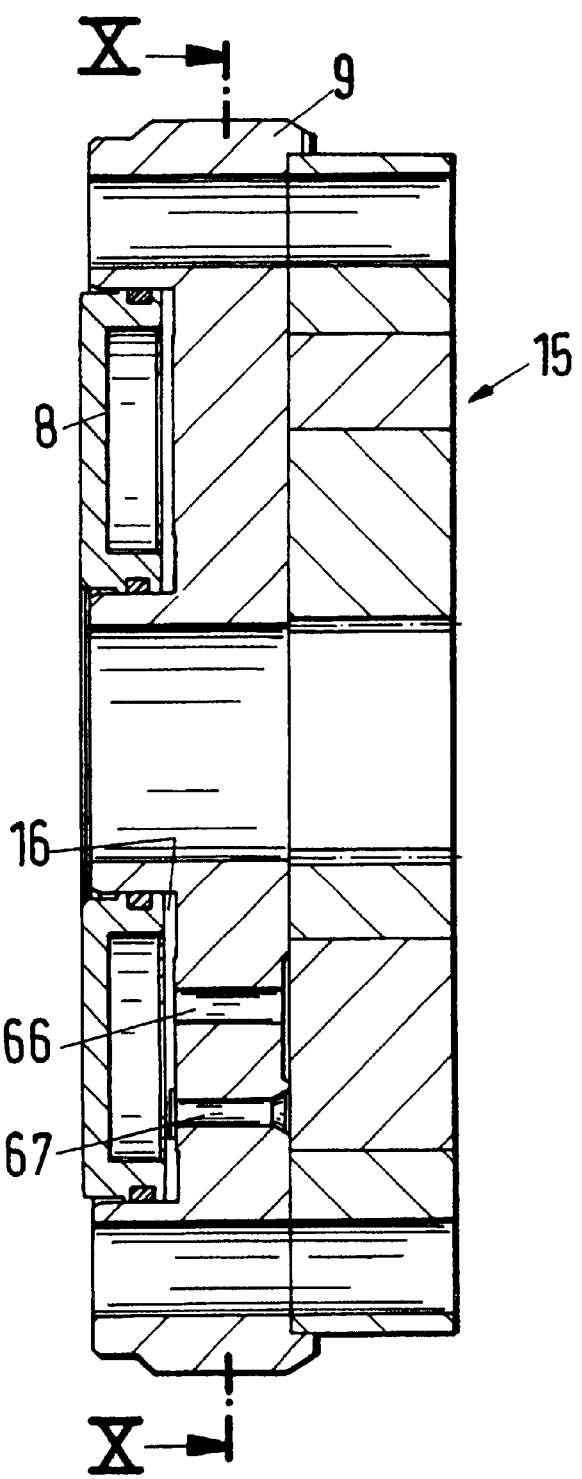
FIG. 9 shows a second embodiment of the actuating device according to the invention in an illustration according to FIG. 5.
Figure 10:
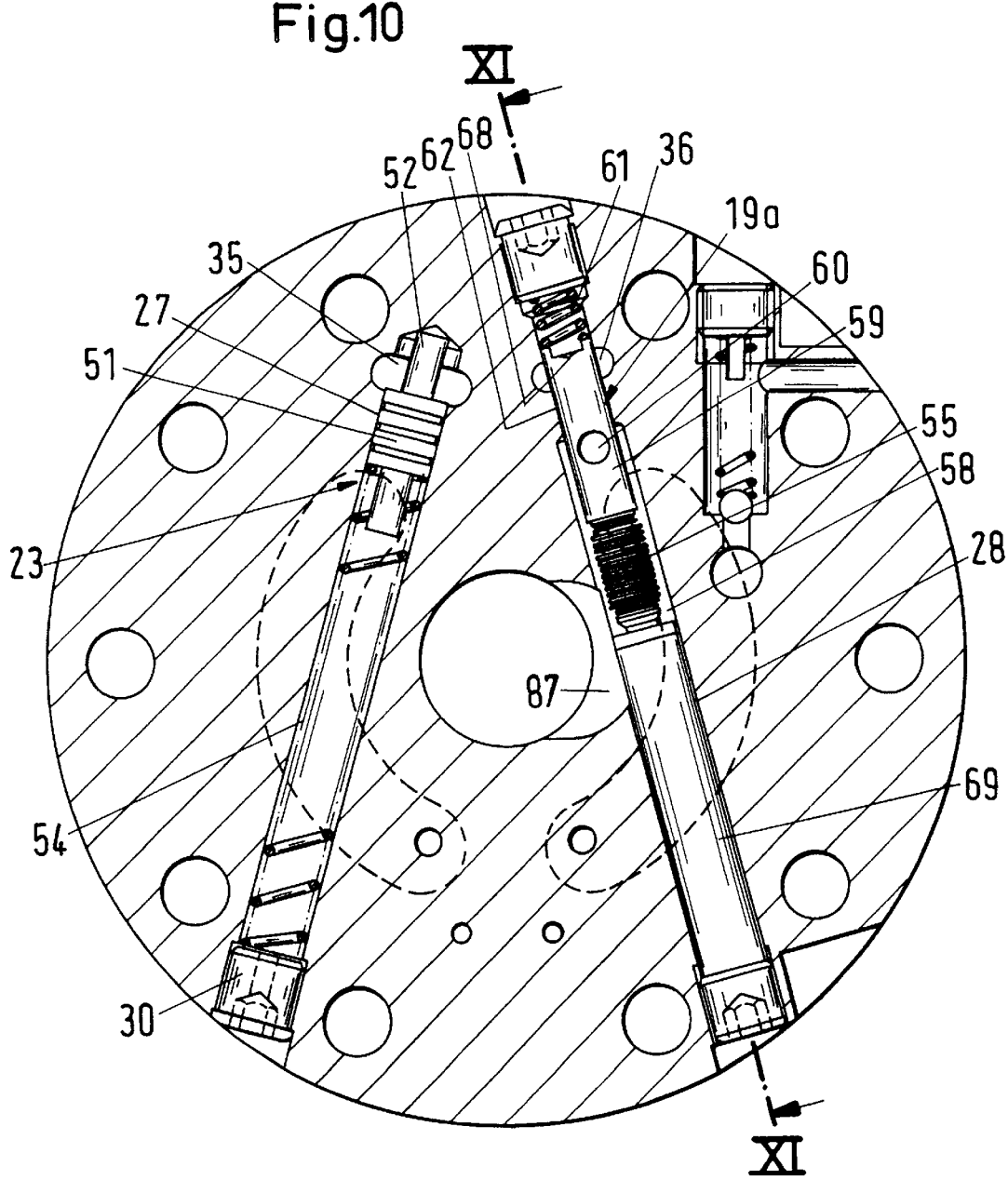
FIG. 10 is a section along the line X—X of FIG. 9.
Figure 11:
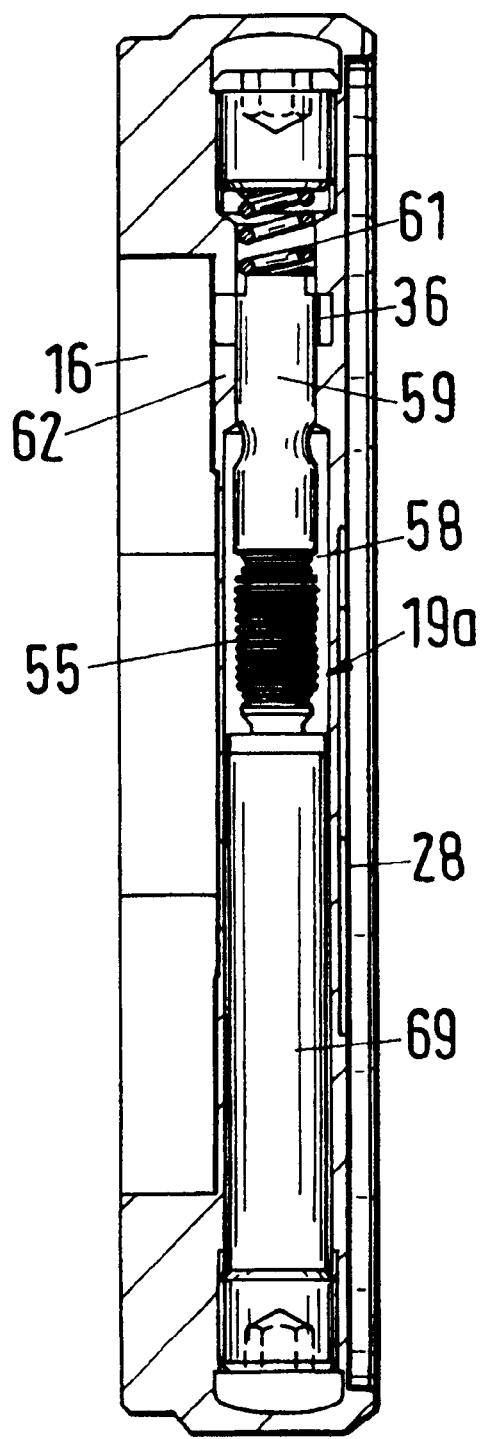
FIG. 11 is a section along the line XI—XI of FIG. 10.

The bore 34 receiving the pressure limiting valve 22 is closed by a valve ball 40 relative to a transverse bore 41 which opens into the pressure chamber 16 (see FIGS. 4 and 6). The valve ball 40 is subjected to the force of a pressure spring 42 which is supported on an adjusting screw 43 provided for adjusting the spring force.

As shown in FIG. 6, a substantially V-shaped spring element 44 is fastened on the bottom of the pressure chamber 16. It is attached in the area of a stay by means of two rivets 45 etc. on the pressure chamber bottom. On the side facing the pressure chamber bottom, a valve element 48, 49 is respectively positioned on each free end of the two legs 46, 47 of the spring element 44. These valve elements 48, 49 respectively can close a bore that opens into the pressure chamber bottom. The spring element 44 and the valve elements 48, 49 form return valves 50 (see FIG. 1) for closing the pressure conduit 17 relative to the tank 20.

Figures 17A, 17B:
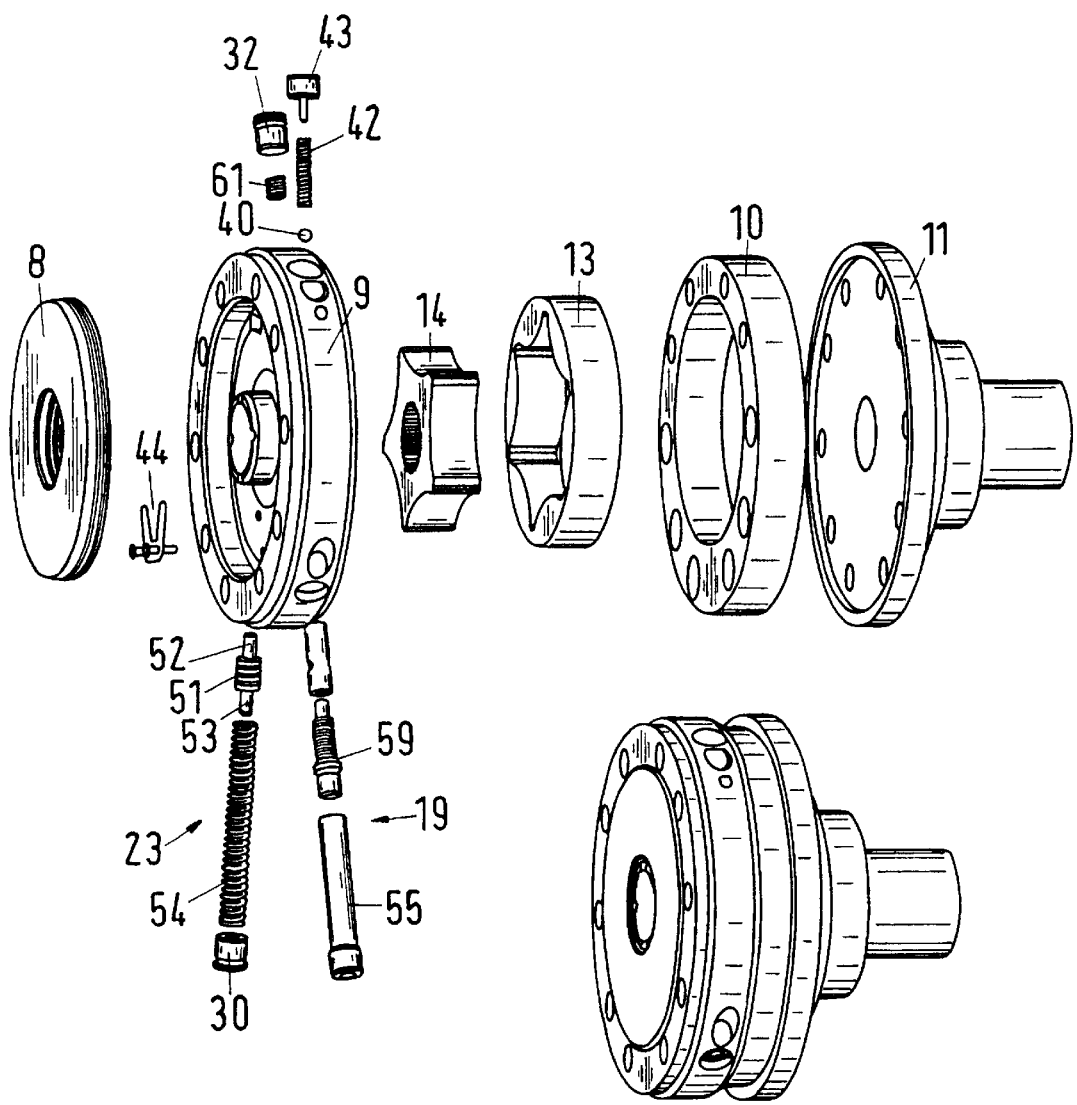
FIG. 17a is an exploded view and FIG. 17b is a perspective view of the actuating device according to the invention.

The pulsation dampening device 23 has a damping piston 51 which rests sealingly against the wall of the bore 27 and has at its two end faces axially projecting pin-shaped projections 52, 53 of a smaller diameter (see FIGS. 4 and 17a, b). The projection 53 is used as a centering means for a pressure spring 54 that forces the damping piston 51 into the end position illustrated in FIG. 4. In this end position the damping piston 51 rests with its other projection 52 on the closure member 30. The closure member 30 is advantageously an adjusting screw which allows a continuous adjustment of the force of the pressure spring 54. In the end position of the damping piston 51 the transverse bore 35 is not completely closed so that communication is provided between the pressure chamber 16 of the piston housing 9 and the bore 27.

Figures 14A, 14B:
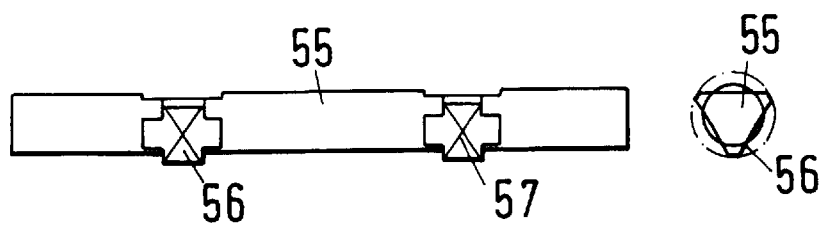
FIG. 14a is a side view and FIG. 14b is an end view of a further embodiment of a throttle element.

The throttle element 19 comprises preferably a lifting element 55 (FIGS. 4, 7, and 14a, b) comprised of plastic material which has over its length a circular cross-section. The lifting element 55 has guides 56, 57, triangular in cross-section (see FIGS. 4 and 14a, b), in areas that are spaced from one another and from the ends of the lifting element 55. The lifting element 55 is guided by means of the guides 56, 57 on the wall of the bore 28. The corners of the guides 56, 57 are curved to match the curvature of the bore wall so that the lifting element 55 can be guided properly in the bore. In the area external to these guides 56, 57, the diameter of the lifting element 55 is smaller than the diameter of the bore 28. Since the guides 56, 57 with their triangular cross-section rest only with their corner areas on the bore walls, an annular channel 58 (FIG. 7) is formed between the lifting element 55 and the bore wall. The hydraulic medium can be guided through this channel 58 via the bores 37 and 39 to the tank 20 in a manner to be disclosed in the following.

The lifting element 55 is positioned with its end on the closure member 33 which is preferably embodied as an adjusting screw. With this arrangement, the position of the lifting element 55 in the bore 28 can be finely adjusted.

The lifting element 55 is comprised of a plastic material with high-temperature resistance and a great longitudinal expansion coefficient. Depending on the temperature of the hydraulic medium, the lifting element 55 thus widens or expands to different degrees.

Figure 7:
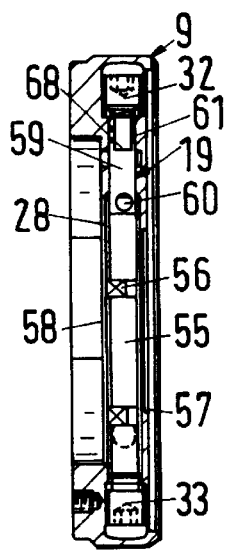
FIG. 7 is a section along the line VII—VII of FIG. 4.

The piston 59 is moved by the lifting element 55 (FIGS. 7 and 17a, b), wherein the piston 59 is embodied as a hollow piston and rests against the lifting element 55. The hydraulic medium, which flows during operation of the rotor pump 15 via the transverse bore 36 into the bore 28, flows via the control notch 68 into the interior of the hollow piston 59. The control notch 68 is formed by a depression provided on the end face of the hollow piston 59 and, in comparison to the transverse bore 36, has only a very small flow cross-section for the hydraulic medium. In the vicinity of the contact location on the lifting element 55, the piston 59 is provided with a transverse bore 60 via which the hydraulic medium flows into the annular chamber 58. The piston 59 is positioned, as illustrated in FIGS. 4 and 7, on the wall of a portion 62 of the bore 28 having a reduced cross-section. The hollow piston 59 is loaded by the force of a pressure spring 61 by which the hollow piston 59 is maintained in contact on the lifting element 55. The hollow piston 59 extends into the area of the transverse bore 36 via which the hydraulic medium can flow out of the pressure chamber 16 into the hollow piston 59.

In the position represented in FIGS. 4 and 7, the transverse bore 60 is positioned completely outside of the narrow bore portion so that the entire cross-section of the transverse bore 60 is available for the hydraulic medium to exit into the annular chamber 58.

When operating the differential, the hydraulic medium is heated so that the lifting element 55 is also correspondingly heated and expanded. This has the consequence that, due to the longitudinal expansion of the lifting element 55, the hollow piston 59 can be moved counter to the force of the pressure spring 61 into the bore 28. Accordingly, the flow cross-section of the control notch 68 is reduced. Since the hydraulic medium, as a result of the higher temperature, is more liquid, the small flow cross-section is sufficient for the hydraulic medium. It exits via the transverse bore 60 into the annular chamber 58. The throttle element 19 thus provides a temperature-compensated valve for compensating the temperature dependency of the viscosity of the hydraulic medium. When the operating temperature is relatively low and the hydraulic medium is correspondingly viscous, the entire cross-section of the control notch 68 of the hollow piston 59 is available for hydraulic medium flow. When with increasing operating temperature the hydraulic medium becomes thinner, the flow cross-section of the control notch 68 is reduced because of the aforementioned longitudinal expansion of the lifting element 55. In this manner, a precise temperature compensation is ensured.

The strong pulsations of the pressure resulting from operation of the rotor pump 15 are reduced by the pulsation damping device 23 so much that they will not impair the function of the differential lock. The damping piston 51 of the pulsation damping device 23 is configured such that in the initial position (represented in FIG. 4) the transverse bore 35 is not closed so that the hydraulic medium can flow from the pressure chamber 16 via this transverse bore 35 into the bore 27. In correspondence with the pressure pulse, the damping piston 51 is moved against the force of the pressure spring 54 in the bore 27 so that the pressure and flow volume peaks caused by the rotor pump 15 are compensated.

Figure 16:
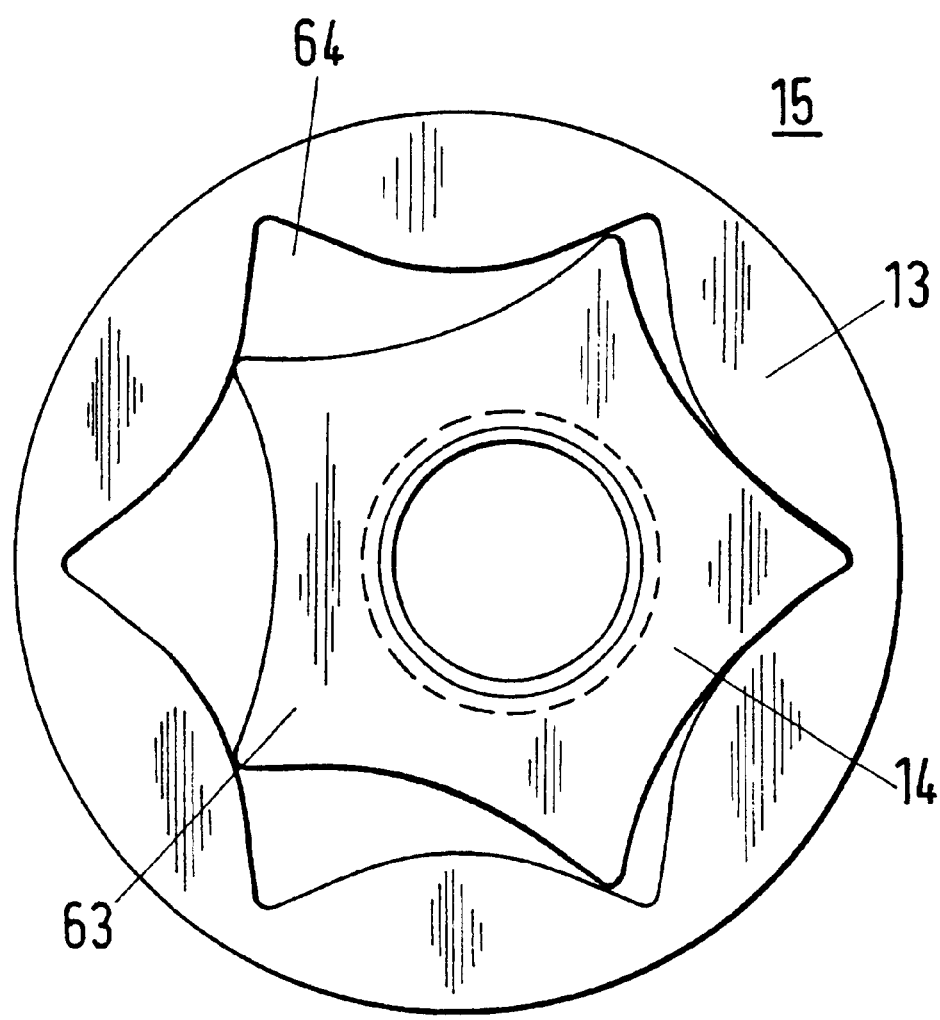
FIG. 16 illustrates schematically an end view of the inner and outer gears of a rotor pump of the actuating device according to the invention.

FIG. 16 shows schematically the rotor pump 15 with the outer ring 13 and the inner ring 14. The inner ring 14 has, for example, five teeth 63 having corresponding depressions 64 in the outer ring 13. The minimal number of teeth and the low speed (rpm) cause the aforementioned strong pulsations of the hydraulic pressure or of the transmitted torque which cause a greatly fluctuating conveyed flow volume. By means of the pulsation damping device 23, these fluctuations are, however, greatly reduced or compensated so that the function of the differential and the differential lock is not impaired.

The rotor pump 15 is driven by the differential rpm (speed) between the wheel axle 6 (FIG. 12) and a differential housing 65 of the differential 3. Accordingly, the rotor pump 15 conveys the hydraulic medium via bores 66, 67 (FIG. 5) into the pressure chamber 16 of the piston housing 9. Based on this pressure build-up, the actuator piston 8 is forced axially against the coupling lamellas 4 (FIG. 3) which, by frictional connection, effect the transmission of the torque onto the wheels (not shown) of the vehicle.

In the embodiment according to FIGS. 8 through 11, the hydraulic medium conveyed by the rotor pump 15 also flows via the bores 66, 67 (FIG. 9) into the annular pressure chamber 16 in which the annular actuator piston 8 is axially and seal-tight movable in analogy to the previous embodiment. In this embodiment, the pulsation damping device 23, which is mounted in the bore 27, is identical to that of the previous embodiment. The pulsation damping device 23 comprises the damping piston 51 which is movable in the bore 27 in a seal-tight fashion and is loaded by the force of the pressure spring 54. In comparison to the previous embodiment, the damping piston 51 is positioned at the end of the bore 27 facing away from the closure member 30, and the bore 27 is a blind bore. The damping piston 51 rests with its projection 52 on the bottom of the bore 27 under the effect of the force of the pressure spring 54. The bore 27 is connected via the transverse bore 35, which in contrast to the previous embodiment is of a slotted hole shape, with the pressure chamber 16 of the piston housing 9. The transverse bore 35 is located at the end of the bore 27 facing away from the closure member 30 and is not closed in the basic position of the damping piston 51 illustrated in FIG. 10. As has been explained with the aid of the previous embodiment, the hydraulic medium upon operation of the rotor pump 15 can flow from the pressure chamber 16 via the transverse bore 35 into the bore 27. In accordance with the pulsations that occur, the damping piston 51 is moved against the force of the pressure spring 54 so that the pulsations are reliably compensated and the function of the differential 3 and the differential lock is not impaired.

The throttle element 19a is mounted in the bore 28 and, in accordance with the previous embodiments, forms a temperature-compensated valve for compensating the temperature-dependency of the viscosity of the hydraulic medium. The hydraulic medium flowing via the transverse bore 36 into the bore 28 flows via the control notch 68 (FIG. 10) into the interior of the hollow piston 59. The control notch 68 is formed by a depression at the end face of the hollow piston 59 which in comparison to the transverse bores.36 has only a very minimal flow cross-section for the hydraulic medium. The hydraulic medium can flow via the transverse bore 60 from the hollow piston into the annular channel 58. The hollow piston 59 is forced by the force of the pressure spring 61 against the lifting element 55. The bore 28 has a portion 62 having a reduced diameter and the hollow piston 59 rests with a portion of its length in a seal-tight fashion against the portion 62. In accordance with the previous embodiment, the hollow piston 59 projects into the area of the bore 28 having a wider diameter so that the annular chamber 58 for the hydraulic medium is formed. The hydraulic medium can flow from the annular chamber 58 via a half-moon shaped notch 87 (FIG. 10) in the piston housing 9 back to the tank 20.

Figure 13:
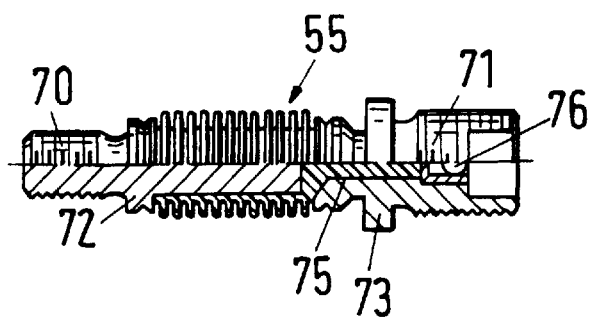
FIG. 13 shows, partially in section, a throttle element of the actuating device according to the invention.
Figure 15:
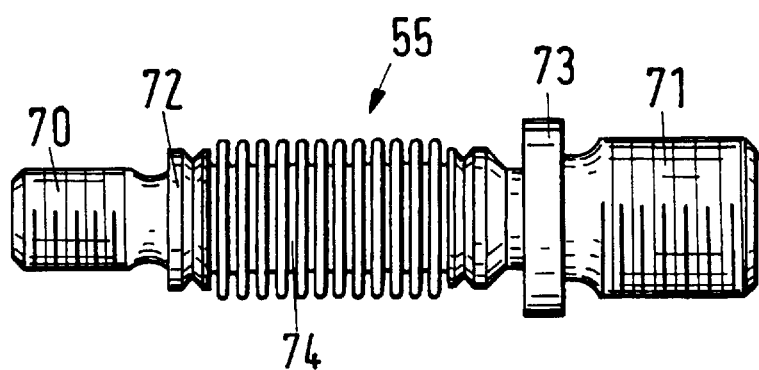
FIG. 15 shows the throttle element according to FIG. 13 in a side view on an enlarged scale.

The lifting element 55 is a bellows element which is formed as a plug-in element having at its two ends respectively a plug part 70, 71 (FIGS. 13 and 15) with which the bellows element (55) is inserted into a support element 69 and the hollow piston 59. The two plug parts 70, 71 are connected respectively by means of a flange 72, 73 to the central portion formed as a bellows 74. The bellows element (55) is filled with a closed-in medium which can be introduced via a filling opening 76 (FIG. 13) in the plug part 71. The bellows 74 is comprised advantageously of a wave-shaped metal pipe. It is completely surrounded by the hydraulic medium flowing within the annular chamber 58 so that a very fast temperature adjustment of the bellows element (55) to the temperature of the hydraulic medium is ensured. Corresponding to the temperature, the length of the bellows element (55) changes and thus also the flow cross-section for the hydraulic medium. The higher the temperature of the hydraulic medium, the greater the expansion of the bellows element (55) in the longitudinal direction. This has the result that the flow cross-section of the control notch 68 is accordingly reduced. Since the hydraulic medium becomes thinner due to the higher temperature, the smaller flow cross-section is sufficient for the hydraulic medium. In this way, the temperature-dependent bellows element (55) also ensures that the function of the differential lock is matched to the non-linear viscosity characteristic line of the hydraulic medium and that the bad volumetric efficiency of the rotor pump 15 at higher temperatures is compensated. As already described in the previous embodiment, a compensation of the volumetric efficiency fluctuation of the pumps 15 is achieved, independent of the volumetric efficiency, by adjusting a certain flow volume for a set constant pump rpm.

In other respects, the embodiment according to FIGS. 8 through 11 is identical to the previous embodiment.

Figure 12:
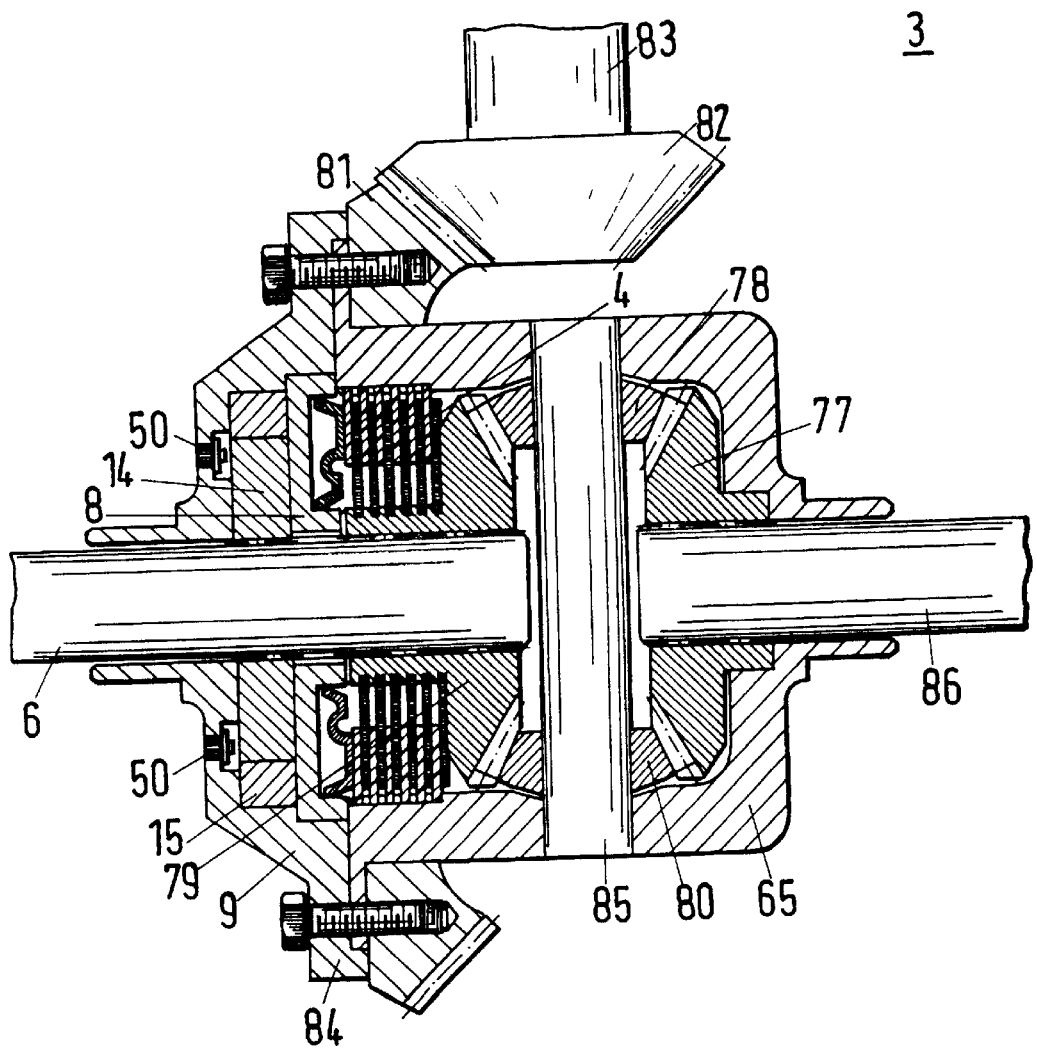
FIG. 12 is a schematic representation of a differential with an actuating device according to the invention.

FIG. 12 shows the differential which is arranged in a housing (not shown) that also forms the tank of the hydraulic medium. The differential comprises a differential housing 65 in which the differential gears 77 through 80 are mounted. A bevel gear 81 is seated fixedly on the differential housing 65 and meshes with a drive pinion 82 of a drive shaft 83.

The piston housing 9 is fastened with a radially outwardly oriented flange 84 on the bevel gear 82. The piston housing 9 closes off the open end of the differential housing 65. In the illustrated embodiment, the piston housing 9, the spacer ring 10, and the pump cover 11 are formed as a unitary (monolithic) part. The wheel axle 6 projects from the piston housing 9. The actuator piston 8 is arranged in the housing 9. The rotor pump 15 is positioned on the side of the actuator piston 8 facing away from the lamella packet 4. The pump chamber of the pump 15 is closed via the interior return valves 50 relative to the tank.

The differential gear 79, which is in the form of a bevel gear, is fixedly mounted on the wheel axle 6 and meshes with the bevel gears 78, 80 which are positioned on axle 85 extending perpendicularly to the wheel axle 6. The axle 85 is supported with its ends in the gear housing 65. A wheel axle 86 is aligned with the wheel axle 6, and a differential gear 77, also formed as a bevel gear, is fixedly seated on the axle 86.

When a differential rpm (speed) occurs between the wheel axle 6, 86 and the differential housing 65, the inner ring 14 and the outer ring 13 of the rotor pump 15 rotate relative to one another so that the hydraulic medium is conveyed in the afore described manner via the bores 66, 67 (FIG. 9), which are closed by the spring element 44, into the pressure chamber 16 and is pressurized. Accordingly, the actuator piston 8 is moved against the coupling lamellas 4 which are thus compressed. Because of the resulting friction, the torque of the drive shaft 83 is transmitted onto the wheels of the vehicle seated on the wheel axles 6, 86.

Figure 18:
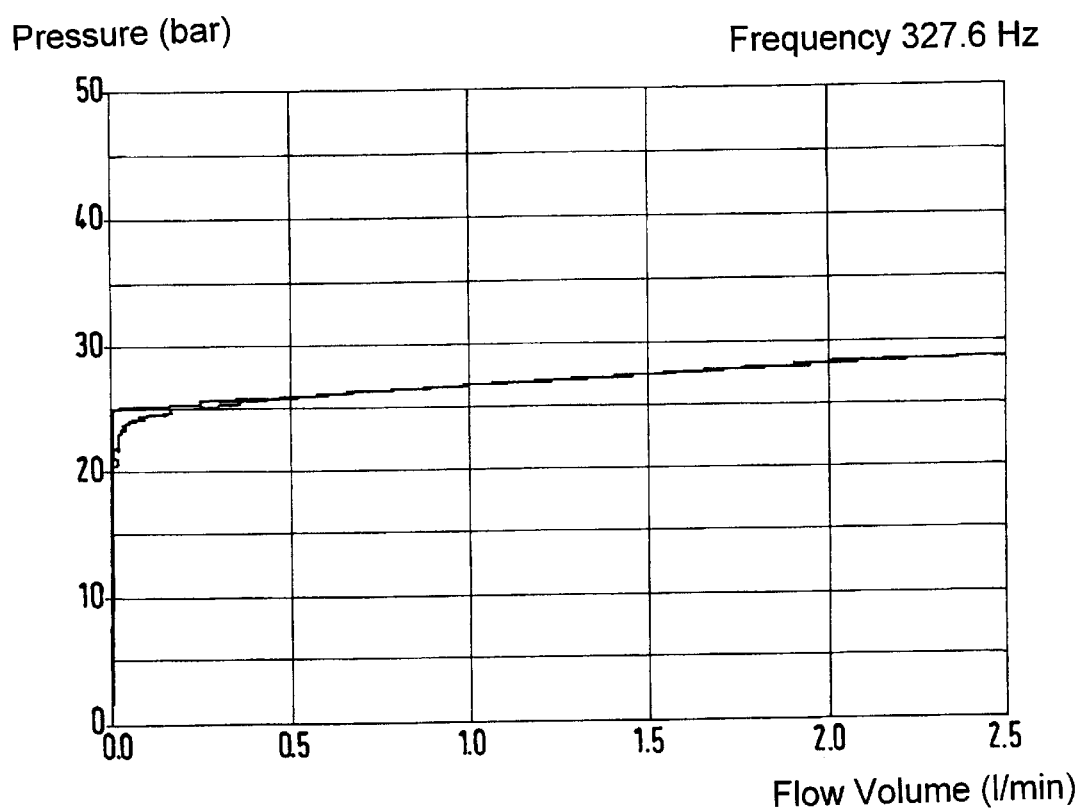
FIG. 18 is a pressure-flow volume diagram of a pressure limiting valve of the actuating device according to the invention.

FIG. 18 shows the pressure-flow volume characteristic line of the pressure limiting valve 22. It can be seen that the pressure in the hydraulic system is increased only minimally, even with increasing flow volume, as a result of the pressure limiting valve.

Figure 19:
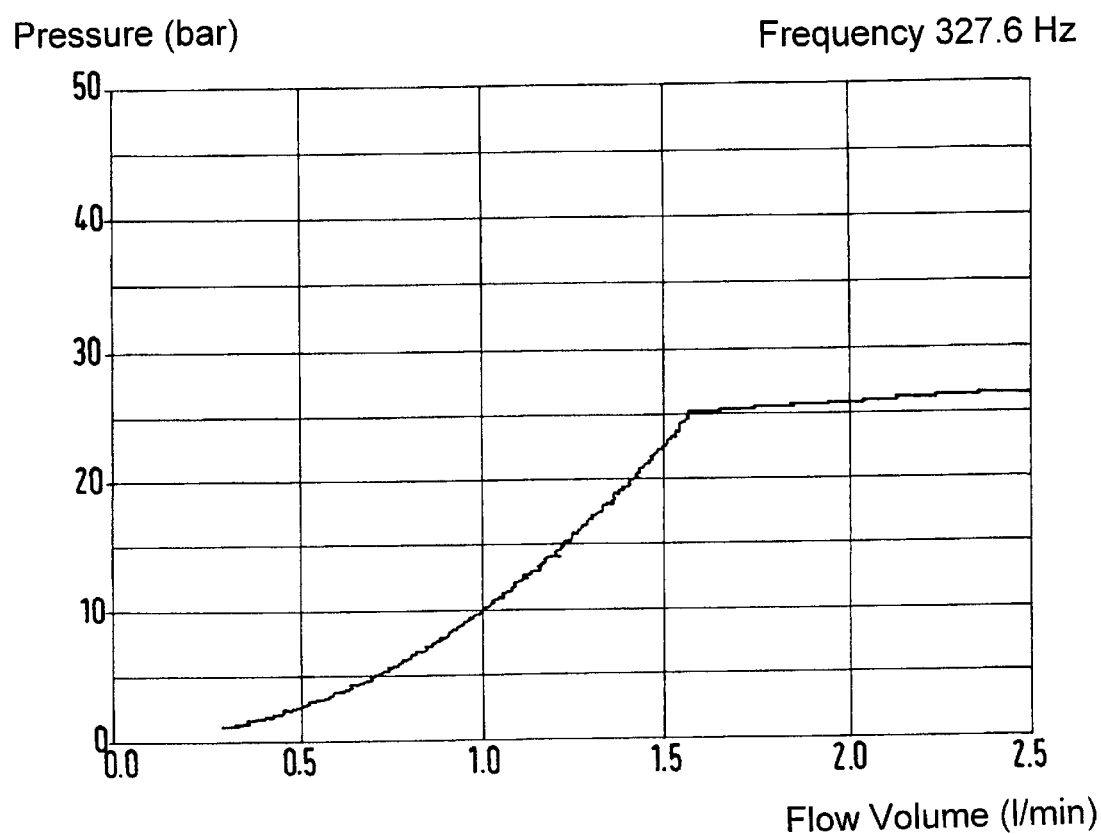
FIG. 19 shows a pressure-flow volume diagram of the entire system.

FIG. 19 shows that the pressure-flow volume characteristic line of the total system initially increases. The pressure increase resulting with increasing flow volume characterizes the throttle element function by means of the throttle element 19, 19a. By means of the pressure limiting valve 22 it is then ensured that the pressure will increase only minimally with increasing flow volume.

Figure 20:
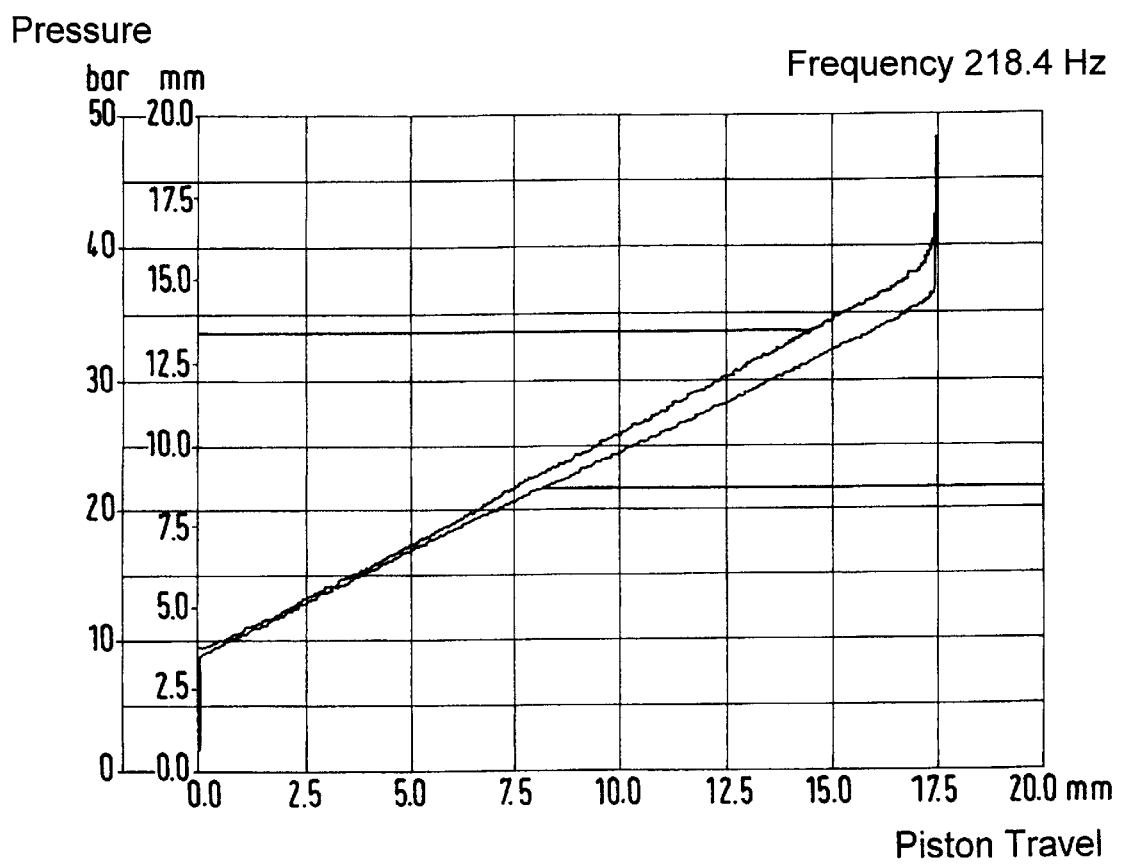
FIG. 20 shows a pressure-travel diagram of a pulsation damping device of the actuating device according to the invention.

The characteristic line of the pulsation damping element 23 is shown in FIG. 20. The pressure in the hydraulic system increases continuously with increasing movement stroke of the actuator piston 8.

As an alternative to the shown and described embodiment, the pump 15 can also be a vane pump which can also be positioned externally. However, the pump must be matched to the differential rpm between the wheel axles 6, 86 and the differential housing 65.

In the described in represented embodiments the throttle element 19, 19a is arranged advantageously in the piston housing 19. Of course, it can also be arranged external to the piston housing.

The throttle element 19, 19a and/or the pressure limiting valve 22 and/or the pulsation damping device 23 can also be arranged in the actuator piston 8.

While specific embodiments of the invention have been shown and described in detail to illustrate the inventive principles, it will be understood that the invention may be embodied otherwise without departing from such principles.

What is claimed is:

1. An actuating device for a differential lock, said actuating device comprising:

a piston housing (9) having a pressure chamber (16);

an actuator piston (8) arranged in said pressure chamber (16) of said piston housing (9);

a hydraulic medium tank (20);

a pump (15) configured to convey a hydraulic medium from said tank (20) to one end of said actuator piston (8), wherein said actuator piston (8) is configured to be moved in said pressure chamber (16) and act on the differential lock when loaded by the hydraulic medium;

one or more conduits (18, 37) configured to connect said hydraulic medium tank (20) and said pressure chamber (16) to one another and having a temperature-dependent throttle element (19, 19a);

wherein said temperature-dependent throttle element (19, 19a) is comprised of a lifting element (55) and a piston (59) coaxially and successively arranged in a bore (28) and abutting one another, wherein said lifting element (55) has a length in an axial direction of said bore (28) and changes said length as a function of a temperature of the hydraulic medium acting on said lifting element (55), wherein said lifting element (55) moves said piston (59) in said axial direction within said bore (28) when changing said length such that a flow-cross-section of said temperature-dependent throttle element (19, 19a) is changed.

2. The actuating device according to claim 1, wherein said throttle element (19, 19a) is arranged in said piston housing (9).

3. The actuating device according to claim 1, wherein said throttle element (19, 19a) is arranged in said actuator piston (8).

4. The actuating device according to claim 1, wherein said lifting element (55) is configured to change dimensions as a function of a temperature of the hydraulic medium acting on said lifting element (55).

5. The actuating device according to claim 1, wherein said flow-cross-section of said throttle element (19) is configured to decrease with increasing temperature.

6. The actuating device according to claim 1, wherein a cross-section of said lifting element (55) perpendicular to said length is smaller over a portion of said length than a cross-section of said conduit (18, 37).

7. The actuating device according to claim 1, wherein said throttle element (19, 19a) has an annular chamber (58) surrounding said lifting element (55) and wherein the hydraulic medium returns into said tank (20) via said annular chamber (58).

8. The actuating device according to claim 1, wherein said lifting element (55) comprises a bellows (74).

9. The actuating device according to claim 1, comprising at least one pulsation damping device (23).

10. The actuating device according to claim 9, wherein said pulsation damping device (23) comprises a damping piston (51) and a spring (54), wherein said damping piston (51) is configured to be moveable against a force of said spring (54).

11. The actuating device according to claim 9, wherein said pulsation damping device (23) is arranged in a bore (27) of said piston housing (9).

12. The actuating device according to claim 9, wherein said pulsation damping device (23) is arranged in a bore of said actuator piston (8).

13. The actuating device according to claim 1, comprising at least one pressure limiting valve (22).

14. The actuating device according to claim 13, wherein said pressure limiting valve (22) is arranged in said piston housing (9).

15. The actuating device according to claim 13, wherein said pressure limiting valve (22) is arranged in said actuator piston (8).

* * * * *